US006954495B2

(12) United States Patent
Piirainen

(10) Patent No.: US 6,954,495 B2
(45) Date of Patent: Oct. 11, 2005

(54) OPTIMIZATION OF CHANNEL EQUALIZER

(75) Inventor: Olli Piirainen, Oulu (FI)

(73) Assignee: Nokia Corporation, Espoo (FI)

( * ) Notice: Subject to any disclaimer, the term of this patent is extended or adjusted under 35 U.S.C. 154(b) by 446 days.

(21) Appl. No.: 09/998,183

(22) Filed: Dec. 3, 2001

(65) Prior Publication Data

US 2002/0057735 A1 May 16, 2002

Related U.S. Application Data

(63) Continuation of application No. PCT/FI01/00334, filed on Apr. 5, 2001.

(30) Foreign Application Priority Data

Apr. 6, 2000 (FI) ............................................ 20000820

(51) Int. Cl.$^{7}$ ............................ H03H 7/30; H03H 7/40; H03K 5/159

(52) U.S. Cl. ....................... 375/233; 375/232; 375/229; 375/346; 375/350

(58) Field of Search ................................ 375/229–235, 375/350, 346; 708/322, 323

(56) References Cited

U.S. PATENT DOCUMENTS

| | | | | | |
|---|---|---|---|---|---|
| 5,199,047 | A | | 3/1993 | Koch | |
| 5,297,168 | A | | 3/1994 | Sant'Agostino et al. | |
| 5,303,263 | A | * | 4/1994 | Shoji et al. | 375/229 |
| 5,327,460 | A | | 7/1994 | Batruni | |
| 5,390,364 | A | | 2/1995 | Webster et al. | |
| 5,432,816 | A | * | 7/1995 | Gozzo | 375/232 |
| 5,727,032 | A | | 3/1998 | Jamal et al. | |
| 6,151,358 | A | * | 11/2000 | Lee et al. | 375/232 |
| 6,535,554 | B1 | * | 3/2003 | Webster et al. | 375/233 |
| 6,724,841 | B2 | * | 4/2004 | Piirainen | 375/346 |

* cited by examiner

*Primary Examiner*—Phuong Phu
(74) *Attorney, Agent, or Firm*—Pillsbury Winthrop Shaw Pittman LLP

(57) ABSTRACT

A method for carrying out channel equalization in a radio receiver wherein an impulse response is estimated, noise power is determined by estimating a co-variance matrix of the noise contained in a received signal before prefiltering, and tap coefficients of prefilters and an equalizer are calculated. The method comprises determining the noise power after prefiltering by estimating a noise covariance matrix, after which input signals of the channel equalizer are weighted by weighting coefficients obtained from the noise covariance estimation.

12 Claims, 3 Drawing Sheets

OPTIMIZATION OF CHANNEL EQUALIZER

This is the Continuation of International Application PCT/FI01/00334 which was filed on Apr. 5, 2001 and published in the English language.

FIELD

The invention relates to estimating noise power in a radio receiver in order to determine channel equalizer parameters.

BACKGROUND

Radio receivers employ different channel equalizers to remove intersymbol interference (ISI), which is caused by linear and non-linear distortions to which a signal is subjected in a radio channel. Intersymbol interference occurs in band-limited channels when the pulse shape used spreads to adjacent pulse intervals. The problem is particularly serious at high transmission rates in data transfer applications. There are many different types of equalizers, such as a DFE (Decision Feedback Equalizer), an ML (Maximum Likelihood) equalizer and an MLSE (Maximum Likelihood Sequence Estimation Equalizer), the two latter ones being based on the Viterbi algorithm.

It is widely known that the information received from equalizers based on the Viterbi algorithm for soft decision making in decoding must be weighted taking noise or interference power into account in order to enable the performance to be optimized. The problem is then how to estimate the noise power in a reliable manner.

Publication U.S. Pat. No. 5,199,047 discloses a method which enables reception quality to be estimated in TDMA (Time Division Multiple Access) systems. In the method, channel equalizers are adjusted by comparing a training sequence stored in advance in the memory with a received training sequence. A training sequence is transmitted in connection with each data transmission. The publication discloses a widely known receiver structure wherein impulse response H(O) of a channel is determined by calculating the cross-correlation of received training sequence X' with sequence X stored in the memory. This impulse response controls a Viterbi equalizer. The publication discloses a method which enables the reception quality to be estimated by calculating estimate S for a received signal $$S = \sum_{0}^{i} s_i = \sum_{0}^{I} |y_i - x_i'|^2, \qquad (1)$$

wherein $y_i$ is the calculated estimate for a signal (including a training sequence) transmitted without interference, and $x_i$ ' is the received sample.

The lower estimate S is, the higher the correlation of the estimated training sequence with the received signal sample. Hence, the lower estimate S is, the higher the likelihood that the transmitted data bits can be detected by the channel equalizer used.

The publication also discloses a relative estimate, i.e. quality coefficient Q, which takes the power of the received signal into account $$Q = \frac{\sum |X_i'|^2}{S} = \frac{\sum |x_i'|^2}{\sum |y_i - x_i'|^2}, \qquad (2)$$

wherein quadratic values of training sequence $X_i$ ' or individual sample values $x_i$ ' are summed in order to determine received signal energy.

A receiver usually, e.g. in a GSM (Global System for Mobile Communications) system modification called EDGE (Enhanced Data Services for GSM Evolution), comprises prefilters before the channel equalizer. Publication U.S. Pat. No. 5,199,047 does not disclose how this fact can be utilized in optimizing the channel equalizer.

BRIEF DESCRIPTION OF THE INVENTION

An object of the invention is thus to provide a method for optimizing a channel equalizer by estimating noise power in two stages, and an apparatus implementing the method. This is achieved by a method for carrying out channel equalization in a radio receiver wherein an impulse response is estimated, noise power is determined by estimating a covariance matrix of the noise contained in a received signal before prefiltering, and tap coefficients of prefilters and an equalizer are calculated. The method comprises determining the noise power after prefiltering by estimating a noise variance, and weighting input signals of the channel equalizer by weighting coefficients obtained by estimating the noise variance.

The invention also relates to a radio receiver comprising means for estimating an impulse response, means for determining noise power of a received signal by estimating a covariance matrix of the noise contained in the received signal before prefiltering, and means for calculating tap coefficients of prefilters and a channel equalizer. The receiver comprises means for determining the noise power after prefiltering by estimating a noise variance, and the receiver comprises means for weighting input signals of the channel equalizer by weighting coefficients obtained from the noise variance estimation.

Preferred embodiments of the invention are disclosed in the dependent claims.

The invention is based on estimating the noise power, i.e. noise variance, of a received signal not only before but also after prefiltering. Weighting coefficients obtained from the estimation are used for weighting an input signal of a channel equalizer.

The method and system of the invention provide several advantages. By weighting the input signal of the channel equalizer, the performance of channel decoding can be improved. This is particularly advantageous if, due to the modulation method of the system, the performance of channel decoding is of considerable importance, such as in a GSM modification called EDGE. In addition, estimating the noise again after prefiltering enables errors occurred in the prefiltering to be taken into account.

BRIEF DESCRIPTION OF THE DRAWINGS

The invention is now described in closer detail in connection with the preferred embodiments and with reference to the accompanying drawings, in which.

DESCRIPTION OF THE EMBODIMENTS

The invention can be applied to all wireless communication system receivers, in network parts, such as base transceiver stations, and in different subscriber terminals as well.

Figure 1:
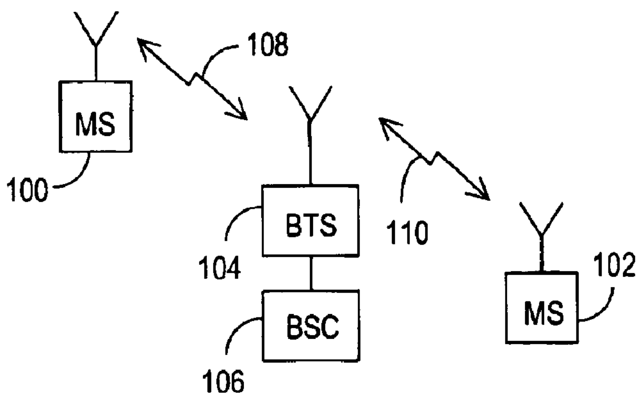
FIG. 1 illustrates an example of a telecommunication system.

FIG. 1 illustrates, in a simplified manner, a digital data transfer system to which the solution of the invention can be applied. The system is part of a cellular radio system comprising a base transceiver station 104 having a radio connection 108 and 110 to subscriber terminals 100 and 102 that can be fixedly positioned, located in a vehicle or portable terminals to be carried around. The transceivers of the base transceiver station are connected to an antenna unit, which is used for implementing a duplex radio connection to a subscriber terminal. The base transceiver station is further connected to a base station controller 106, which conveys the subscriber terminal connections to other parts of the network. In a centralized manner, the base station controller controls several base transceiver stations connected thereto.

The cellular radio system may also be connected to a public switched telephone network, in which case a transcoder converts different digital speech encoding modes used between the public switched telephone network and the cellular radio network into compatible ones, e.g. from the 64 kbit/s mode of the fixed network into another (e.g. 13 kbit/s) mode of the cellular radio network, and vice versa.

Figure 2:
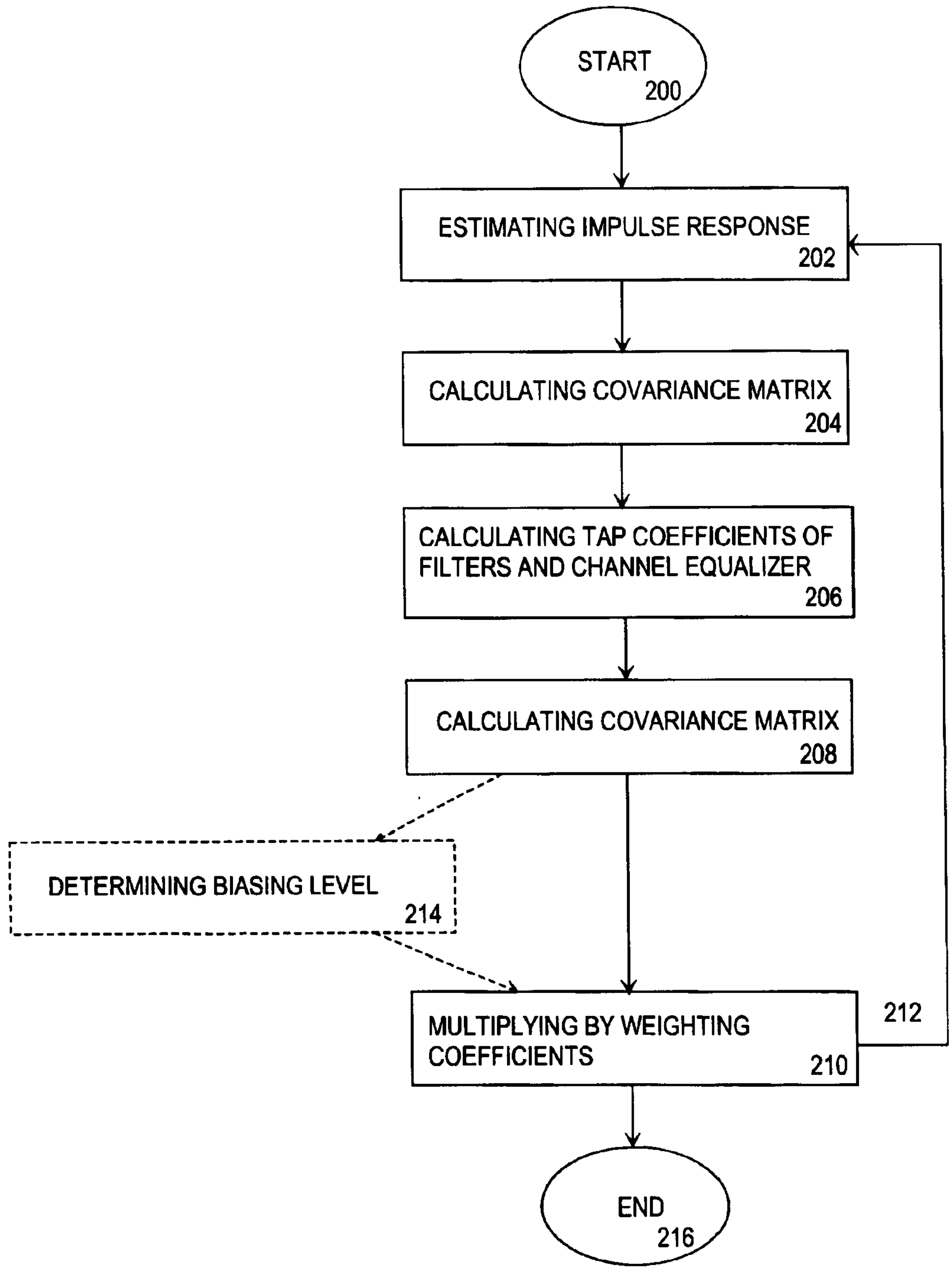
FIG. 2 is a flow diagram showing method steps for estimating a noise covariance twice, and potentially unbiasing an estimate.

FIG. 2 is a flow diagram showing method steps for estimating a noise variance in two stages, and for weighting an input signal of a channel equalizer by weighting coefficients obtained from the noise variance estimation. The individual method steps of the flow diagram will be explained in closer detail in connection with the description of a receiver structure. The process starts from block 200.

Figure 3:
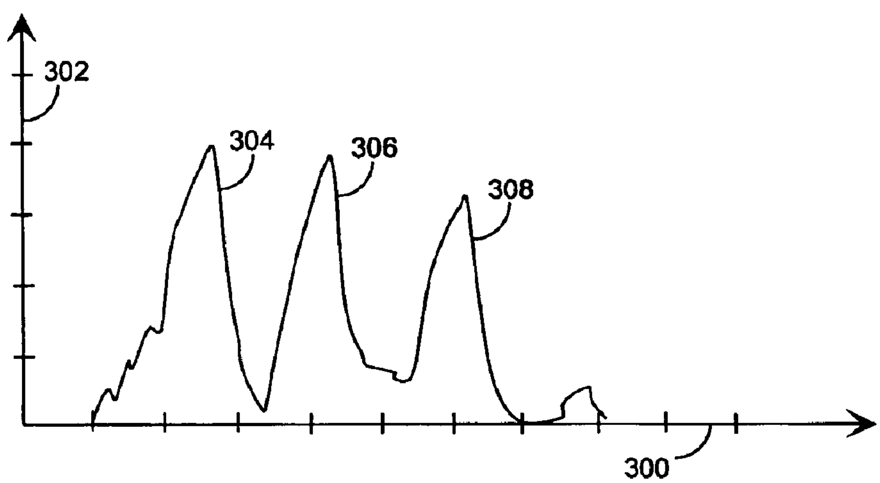
FIG. 3 shows an impulse response of a received signal.

In block 202, an impulse response is calculated. FIG. 3 illustrates a measured impulse response by way of example. In a typical cellular radio environment, the signals between a base transceiver station and a subscriber terminal propagate taking several different routes between a transmitter and a receiver. This multipath propagation is mainly caused by a signal being reflected from surrounding surfaces. Signals propagated via different routes arrive at the receiver at different times due to a different propagation delay. This applies to both transmission directions. This multipath propagation of a transmitted signal can be monitored at the receiver by measuring the impulse response of a received signal, in which the signals that have different times of arrival are shown as peaks proportional to their signal strength. FIG. 3 illustrates the measured impulse response by way of example. The horizontal axis 300 designates time and the vertical axis 302 designates the strength of the received signal. Peak points 304, 306, 308 of the curve indicate the strongest components of the received signal.

Next, in block 204, a covariance matrix of the signal is estimated, the diagonal thereof providing a noise variance in a vector form, according to Formula 7. In block 206, tap coefficients of prefilters and a channel equalizer are calculated using a known method. In block 208, the noise variance is estimated again, according to Formula 10. Finally, in block 210, the signals supplied to the channel equalizer are weighted by weighting coefficients obtained by the noise estimation. Arrow 212 describes the repeatability of the method according to the requirements of the system standard being used, e.g. time slot specifically. In block 214, the level of possible biasing in the estimate is assessed in order to determine parameters according to Formula 11. This step is not necessary but will improve the performance if the tap coefficients of the prefilters have been determined using an equalizer algorithm which causes biasing to the noise energy estimate. The process ends in block 216.

Next, each method step will be described in closer detail by means of a simplified receiver structure necessary for determining the channel equalizer parameters, the structure being shown in FIG. 4. For illustrative reasons, the figure only shows receiver structure parts relevant to the description of the invention.

Estimation block 400 receives the sampled signal as input, and the impulse response of each branch is estimated according to the prior art by cross-correlating received samples with a known sequence. A method for estimating impulse responses applicable to the known systems, which is applied e.g. to the GSM system, utilizes a known training sequence attached to a burst. 16 bits of the 26-bit-long training sequence are then used for estimating each impulse response tap. The structure usually also comprises a matched filter to reconstruct a signal distorted in the channel to the original data stream at a symbol error likelihood which depends on interference factors, such as intersymbol interference ISI. The autocorrelation taps of the estimated impulse response are calculated at the matched filter. The facilities described above can be implemented in many ways, e.g. by software run in a processor or by a hardware configuration, such as a logic built using separate components or ASIC (Application Specific Integrated Circuit).

After estimating the impulse response, the noise covariance matrix is calculated in block 402. According to the prior art, the covariance matrix can be estimated e.g. as follows:

In a linear case, a sampled signal vector can be shown in the form (variables in bold characters being vectors or matrixes)

$$y_1 = H_1 x + w_1$$

$$y_2 = H_2 x + w_2' \tag{3}$$

wherein $y_1$ and $y_2$ are sample vectors of the for $[y[n]y[n+1] \ldots y[N-1]]^T$, when n=0, 1, . . . , N−1, wherein n is the number of samples and T is a transpose, x is the vector to be estimated, $w_1$ and $w_2$ are noise vectors of the form $[w[n]w[n+1] \ldots w[N-1]]^T$, H is a known observation matrix whose dimensions are $N \times (N+h_1-1)$, wherein $h_1$ is the length of the impulse response and wherein h( ) are impulse response observation values, and which is of the form $$H = \begin{bmatrix} h(0) & h(1) & \ldots & h(h_l) & 0 & 0 & \ldots & 0 \\ 0 & h(0) & h(1) & \ldots & h(h_l) & 0 & \ldots & 0 \\ \vdots & & & & & & & \\ 0 & 0 & \ldots & 0 & h(0) & h(1) & \ldots & h(h_l) \end{bmatrix},$$

i.e. matrix H comprises an upper triangle matrix and a lower triangle matrix whose value is 0. Matrix multiplication Hx calculates the impulse response and information convolution.

Thus, the covariance of the two samples $y_1$ and $y_2$ is $$\mu_{12} = E[(y_1 - E(y_1))(y_2 - E(y_2))*] \quad (4)$$
$$= \int_{-\infty}^{\infty}\int_{-\infty}^{\infty}(y_1 - E(y_1))(y_2 - E(y_2)) * p(y_1, y_2)dy_1dy_2$$
$$= \int_{-\infty}^{\infty}\int_{-\infty}^{\infty}y_1y_2p(y_1, y_2)dy_1dy_2 - E(y_1)E(y_2)$$
$$= E(y_1y_2) - E(y_1)E(y_2)$$

wherein $E(y_1)$ is the expected value of $y_1$ and of the form $$E(y_1) = \int_{-\infty}^{\infty}y_1p(y_1)dy_1. \quad (5)$$

In Formulas (5) and (6), p designates a probability density function and * designates a complex conjugate.

$E(y_2)$ is obtained in a similar manner.

The covariance can be expressed in a matrix form also in the following manner:

$$C=E(e_ie_i^H), \text{ wherein} \quad (6)$$

H designates a complex conjugate transpose of the matrix $$e_i = \begin{pmatrix} w_{i1}^T \\ w_{i2}^T \end{pmatrix} = \begin{pmatrix} (y_{i1} - H_{i1}x)^T \\ (y_{i2} - H_{i2}x)^T \end{pmatrix}, \quad (7)$$

wherein T designates a transpose of the matrix.

Figure 4:
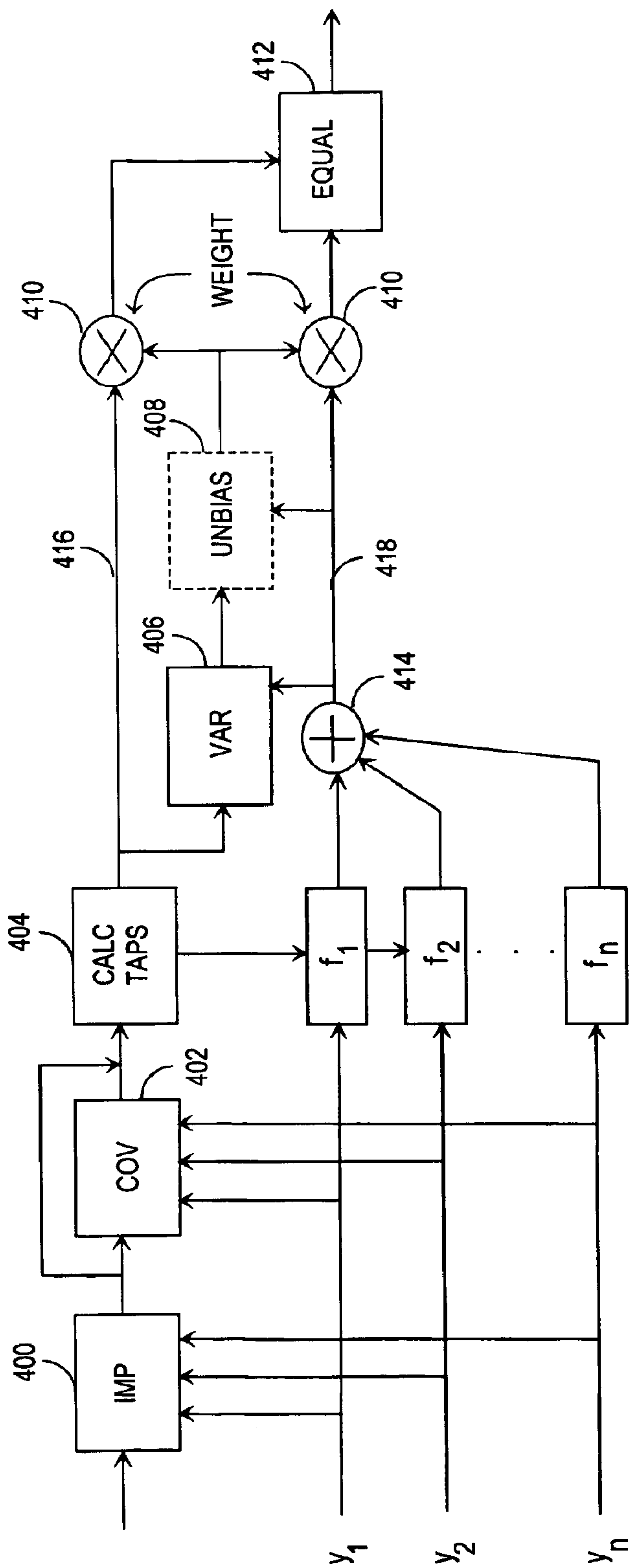
FIG. 4 shows a solution for calculating channel equalizer parameters in a receiver.

According to FIG. 4, there may be more sample vectors than $y_1$ and $y_2$ shown in the formulas for the sake of simplicity. The elements of the diagonal of the covariance matrix form the signal noise variance in the vector form.

The facilities described above can be implemented in many ways, e.g. by software run in a processor or by a hardware configuration, such as a logic built using separate components or ASIC.

In block 404, the tap coefficients of prefilters $f_1$, $f_2$, etc. $f_n$, and the channel equalizer 412 are calculated. The output signals of blocks 400 and 402 serve as input signals of the block. The estimated impulse response values and the noise covariance matrix can be used for determining the tap coefficients of the prefilters. The prefilters may be either of FIR (Finite Impulse Response) or IIR (Infinite Impulse Response) type but not, however, matched filters. IIR filters require less parameters and less memory and calculation capacity than FIR filters that have an equally flat stop band, but the IIR filters cause phase distortion. As far as the application of the invention is concerned, it is irrelevant which filter or method of design is selected, so these will not be discussed in greater detail in the present description. Different methods for designing filters are widely known in the field. An output signal 416 of block 404, which is supplied to weighting means 410, is a modified impulse response.

Several channel equalizers of different type are generally known in the field. In practice, the most common ones include a linear equalizer, DEF (Decision Feedback Equalizer), which is non-linear, and the Viterbi algorithm, which is based on an ML (Maximum Likelihood) receiver. In connection with the Viterbi algorithm, the equalizer optimization criterion is the sequence error likelihood. Conventionally, the equalizer is implemented by means of a linear filter of the FIR type. Such an equalizer can be optimized by applying different criteria. The error likelihood depends non-linearly on the equalizer coefficients, so in practice, the most common optimization criterion is an MSE (Mean-Square Error), i.e. error power $$J_{min}=E|I_k-\hat{I}_k|^2, \text{ wherein} \quad (8)$$

$J_{min}$ is the error power minimum, $I_k$ is a reference signal, and $\hat{I}_k$ is the reference signal estimate, and E is the expected value.

As far as the application of the invention is concerned, it is irrelevant which equalizer or method of optimization is selected, so these will not be discussed in closer detail in the present description. Different methods for optimizing equalizers are widely known in the field.

In block 406, the signal noise variance is calculated again after prefiltering. According to the prior art, the noise variance can be estimated e.g. as follows:

After prefiltering, the signal vector can be expressed in the form $$y_c=H_cx+w_c, \text{ wherein} \quad (9)$$

$y_c$ is a sample vector of the form $[y[n]y[n-1] \ldots y[N+1]]^T$, when n=0, 1, . . . , N−1, wherein n is the number of samples and T is a transpose, x is the vector to be estimated, $w_c$ is a noise vector of the form $[w[n]w[n+1] \ldots w[N-1]]^T$, $H_c$ is a known observation matrix whose dimensions are $N\times(N+h_1-1)$, wherein $h_c$ ( ) are impulse response observation values and $h_1$ is the length of the impulse response, and $$H_c = \begin{bmatrix} h_c(0) & h_c(1) & \ldots & h_c(h_l) & 0 & 0 & \ldots & 0 \\ 0 & h_c(0) & h_c(1) & \ldots & h_c(h_l) & 0 & \ldots & 0 \\ \vdots \\ 0 & 0 & \ldots & 0 & h_c(0) & h_c(1) & \ldots & h_c(h_l) \end{bmatrix}.$$

Thus, noise energy N can be estimated by using the formula $$N=c*w^t_cw_c*/\text{length}(w_c), \text{ wherein} \quad (10)$$

c is a constant selected by the user, which is not necessary but which can, if necessary, be used for e.g. scaling the system dynamics, length is the length of the vector, t is the transpose of the vector,

* is a complex conjugate, and

/ is division.

The functionalities described above can be implemented in many ways, e.g. by software run in a processor or by a hardware configuration, such as a logic built using separate components or ASIC.

If the tap coefficients of the prefilters have been determined by using an equalizer algorithm which causes biasing to the noise energy estimate, such as an MMSE-DFE (Minimum Mean-Square Equalizer—Decision Feedback Equalizer) equalizer algorithm, the estimate is unbiased in order to improve the channel encoding performance. In block 408, the weighting coefficients for unbiasing are calculated from the noise energy estimate as follows:

$$N = \frac{N * E(|y_c|^2)}{(E(|y_c|^2) + N)}, \text{ wherein} \quad (11)$$

N is the noise energy estimate and of the form shown in Formula 10, and $E(|y_c|^2)$ is the expected value of the signal energy after prefiltering.

This is a solution in accordance with FIG. 4.

In formula 10 for calculating noise energy N $$N=c*w^t_c w_c^*/\text{length}(w_c),$$

constant c can be determined using Formula 11, already taking the unbiasing of the noise energy estimate into account when calculating the weighting coefficients. After estimating the noise energy and assessing the effect of potential biasing, the output signal, i.e. the modified impulse response 416, of block 404 and a sum signal 418 formed in an adder 414 of the prefiltered sample signals are multiplied by the obtained weighting coefficients using the weighting means 410 before the actual channel equalizer block 412. This gives more reliable symbol error rate values for channel decoding.

The functionalities described above can be implemented in many ways, e.g. by software run in a processor or by a hardware configuration, such as a logic built using separate components or ASIC.

Although the invention has been described above with reference to the example of the accompanying drawings, it is obvious that the invention is not restricted thereto but can be modified in many ways within the inventive idea disclosed in the attached claims.

What is claimed is:

1. A method for carrying out channel equalization in a radio receiver comprising at least one prefilter and a channel equalizer, the method comprising:

estimating a channel impulse response of a received signal in the channel equalization, determining noise power by estimating a covariance matrix of the noise contained in a received signal before prefiltering the received signal by using the estimated impulse response, calculating tap coefficients of the prefilters and the channel equalizer equalizer by using the noise power and the impulse response estimate, determining the noise power after the prefiltering the received signal by estimating a noise variance after the prefiltering, and weighting input signals of the channel equalizer by weighting coefficients obtained by the estimated noise variance.

2. A method as claimed in claim 1, wherein the signals to be weighted are the impulse response corrected by means of a noise covariance matrix estimate and the received prefiltered signals.

3. A method as claimed in claim 1, wherein the signals supplied to the channel equalizer are weighted by the weighting coefficients that are determined taking biasing in the noise power estimate into account.

4. A method as claimed in claim 1, wherein channel equalization is carried out using a channel equalizer based on the Viterbi algorithm.

5. A method as claimed in claim 1, wherein channel equalization is carried out using a decision feedback channel equalizer.

6. A radio receiver comprising:

means for estimating a channel impulse response of a received signal in the channel equalization, means for determining noise power of a received signal by estimating a covariance matrix of the noise contained in the received signal before prefiltering the recieved signal by using the estimated impulse response, means for calculating tap coefficients of prefilters and a channel equalizer by using the noise power and the impulse response estimate, means for determining the noise power after the prefiltering the received signal by estimating a noise variance after the prefiltering, and means for weighting input signals of the channel equalizer by weighting coefficients obtained from the noise variance estimation.

7. A radio receiver as claimed in claim 6, wherein the signals to be weighted are the impulse response estimates corrected by means of the noise covariance matrix estimate and the received signals after the prefiltering.

8. A radio receiver as claimed in claim 6, the receiver further comprising means for weighting the signals supplied to the channel equalizer by weighting coefficients that are determined taking biasing in the noise power estimate into account.

9. A radio receiver as claimed in claim 6, the receiver further comprising means a channel equalizer based on the Viterbi algorithm.

10. A radio receiver as claimed in claim 6, the receiver further comprising a decision feedback channel equalizer.

11. A module comprising:

means for estimating a channel impulse response of a received signal in the channel equalization, means for determining noise power of a received signal by estimating a covariance matrix of the noise contained in the received signal before prefiltering the received signal by using the estimated impulse response, means for calculating tap coefficients of prefilters and a channel equalizer by using the noise power and the impulse response estimate, means for determining the noise power after the prefiltering the received signal by estimating a noise variance after the prefiltering, and means for weighting input signals of the channel equalizer by weighting coefficients obtained from the noise variance estimation.

12. A computer program product comprising:

means for estimating a channel impulse response of a received signal in the channel equalization, means for determining noise power of a received signal by estimating a covariance matrix of the noise contained in the received signal before prefiltering the received signal by using the estimated impulse response, means for calculating tap coefficients of prefilters and a channel equalizer by using the noise power and the impulse response estimate, means for determining the noise power after the prefiltering the received signal by estimating a noise variance after the prefiltering, and means for weighting input signals of the channel equalizer by weighting coefficients obtained from the noise variance estimation.

* * * * *